3,080,286
CONSTIPATION CORRECTIVES
Edward R. Neary, Teaneck, N.J., assignor to White Laboratories, Inc., Kenilworth, N.J., a corporation of New Jersey
No Drawing. Filed Apr. 5, 1961, Ser. No. 100,814
7 Claims. (Cl. 167—56)

This invention relates to new compositions of matter useful in the treatment of constipation and to processes for the treatment of constipation utilizing such compositions.

Chronic constipation is a common problem, causing its sufferers considerable distress. It is recognized that the normal frequency of bowel movements is quite variable, ranging from one or more a day up to one every second or third day. Chronic constipation is manifested by a persistent infrequency or difficulty of bowel evacuation and, dismissing major organic lesions, is generally conceded to be due to the following causes:

(1) Development of faulty bowel habits, including the failure to respond to the normal defecation reflex (the sensation aroused by a full rectum) and the failure to practice a routine of regularity in evacuating the bowel. A contributing factor is the present-day active schedule of living and working, which tends to interfere with the development of good bowel habits. At first there may be no defect in the musculature or motor function of the intestinal tract, but as the condition progresses the large bowel or colon becomes sluggish. In fact, atony and thinning of the muscular wall of the colon may occur.

(2) Especially in the elderly there is a tendency to eat foods that are concentrated and contain relatively little bulk. This lack of dietary bulk can lead to chronic constipation.

(3) A colon which absorbs fluid too avidly causes undue desiccation of the fecal contents and resultant constipation.

(4) Hypertonic states of the colonic musculature are known to produce spastic type of chronic constipation.

(5) Weakness or depressed activity of the colonic musculature can lead to what is called "atonic" constipation.

Through the years various means have been employed to alleviate chronic constipation. Among these is the use of the cathartic drugs which can be classified into three groups:

(1) Cathartics which rely on an irritant effect on the intestinal wall to stimulate peristalsis. Among these drugs are cascara, castor oil, phenolphthalein and Jalap. These irritant cathartics induce defecation which is usually characterized by a high incidence of colic and loose stools. In some cases, such drugs can cause intestinal damage.

(2) A second large group of cathartics comprises the so-called bulk laxatives. In this class are included the hydrophilic colloids and indigestible cellulose materials, such as psyllium derivatives, karaya gum, agar-agar, bran, and methylcellulose. These are capable of causing intestinal impaction and obstruction. Also in this group are included the saline cathartics which rely on a hypertonic effect within the bowel lumen to produce watery bulk. The action of the saline cathartics is characterized by colic and watery stools, and can result in general dehydration.

(3) A third group is the emollient cathartics, exemplified principally by liquid petrolatum, which act by providing a non-absorbable lubricant bulk to aid evacuation. For the most part, the emollient cathartics do not induce colic or cause purgation but they may interfere seriously with the absorption of essential vitamins.

More recently, non-toxic surface-active agents, typified by dioctyl sodium sulfosuccinate, propylene oxide polymers and ethylene oxide polymers, have come into use as non-laxative fecal softeners for relief of chronic constipation. These agents rely on a surface-tension reduction phenomenon to promote penetration of aqueous intestinal fluids into the fecal mass, maintaining it in a softened and more easily evacuated condition. These surface-active agents do not cause colic or watery stools.

Of the various types of anticonstipants mentioned, it is generally held in medical circles that the "wetting" or surface-activation approach to stool softening is least dangerous, does not lead to cathartic "addiction," systemic toxicity or intestinal irritation, and helps prevent damage to the anorectal lining that may be caused by difficult passage of inspissated stools. The "wetting" or surface-active compounds, most widely used as stool softeners, include the non-toxic salts of dialkyl sulfosuccinic acid. Those that have been employed include sodium, calcium, ammonium and monoethanolamine salts of dioctyl sodium sulfosuccinic acid. Other derivatives that have been used are the water-soluble salts of di-(2-ethylhexyl)sodium sulfosuccinic acid.

While dioctyl sulfosuccinic acid salts have been recognized generally to have advantageous properties over the irritant, bulk-producing, and emollient cathartics that have been used heretofore, they are relatively ineffective in relieving constipation in cases of colonic hypomotility, which is frequently associated with chronically constipated states. Colonic hypomotility is more common and marked among the middle and older age groups, as well as in sedentary and obese people. The condition frequently occurs in pregnancy and following major surgery.

Intestinal hypomotility and atony have been shown to be produced by a deficiency of one of the B vitamins, namely, pantothenic acid. Work has been reported where a 50 percent decrease in gastro-intestinal motility was observed in enterostomized dogs on a pantothenate-deficiency diet. Supplementation with the vitamin resulted in the resumption of normal peristalsis. Further, in rats maintained on a pantothenic acid deficient diet the bowel became distended and a loss of peristaltic activity was observed. After administration of pantothenic acid, distention disappeared and normal bowel motility was restored.

Pantothenic acid is not thought of as being an anticonstipant. The relation between the vitamin and intestinal motor function seems to involve the following sequence of events: Pantothenic acid is incorporated into the "Coenzyme A" molecule; "Coenzyme A" and choline acetylase catalyze the formation of acetylcholine from choline and acetate. The release of acetylcholine at postganglionic parasympathetic effector cells provides the natural or physiologic stimulus for normal gastrointestinal motor activity or peristalsis.

The present invention resides in the concept of dioctyl sodium sulfosuccinate anticonstipant compositions having calcium pantothenate added thereto, and the process for treating constipation which comprises the oral administration of dosage units of such compositions.

The present invention is based on the discovery that the incorporation of calcium pantothenate into dioctyl sulfosuccinic acid salt stool-softeners increases their anticonstipant efficiency to a very substantial degree. The incorporation of calcium pantothenate, or one of its equivalent forms, promotes the regularity of defecation of softened stools. Controlled clinical studies made with the compositions of this invention indicate that they are twice as effective in relieving constipation as are dioctyl sulfosuccinic acid salts alone. Cross-over trials in the clinic confirmed this doubling of effectiveness.

Heretofore the addition to the surface-active agent of undesirable irritant cathartics such as cascara, sagrada and phenolphthalein was necessary to ensure a reliable anticonstipant effect. It is, therefore, an object of this invention to provide improved, nonirritant, stool-softening compositions which do not rely on the use of added cathartics to ensure effective relief of chronic constipation.

Dioctyl sodium sulfosuccinate is a well-known material, and anticonstipant preparations containing it appear in a variety of forms suitable for oral administration. The normal or usual daily dose, when used as a fecal softener, is about 50 to 250 milligrams. The precise formulation in which the anticonstipant dioctyl sulfosuccinic acid salt composition is administered is not critical to the practice of this invention.

It has been found that the addition of at least one-quarter part by weight of calcium pantothenate, or functionally equivalent form thereof, such as the calcium pantothenate-calcium chloride double salt, pantothenic acid, and pantothenyl alcohol, per part of dioctyl sodium sulfosuccinate will cause a significant improvement in the anticonstipant properties of the sulfosuccinate-containing composition. Superior or optimum results are obtained in the range one-half to one part of pantothenate per part of sulfosuccinate. While more pantothenate may be added without detrimental effect, compositions containing more than one part of pantothenate per part sulfosuccinate will show no significant increase in desirable anticonstipative activity.

The preferred compositions of this invention are usually made available in tablet form according to any of the following formulations:

DIOCTYL SODIUM SULFOSUCCINATE AND CALCIUM PANTOTHENATE 480 MILLIGRAM TABLET

*Formula*

CORE

| | Parts per tablet |
|---|---|
| Dioctyl sodium sulfosuccinate [1] | 118 |
| Calcium pantothenate, USP | 50 |
| Calcium gluconate or super-floss | 54 |
| Zein | 5 |
| Alcohol 3A, q.s. | |
| Talc | 6 |
| Magnesium stearate | 2 |
| | 235 |

COATING (APPROXIMATE QUANTITIES)

| | |
|---|---|
| Shellac | 8 |
| Wheat flour | 50 |
| Gelatin | 1 |
| Sucrose | 186 |
| Color and wax | Trace |
| | 480 |

[1] Supplied in a granular form containing 85 percent dioctyl sodium sulfosuccinate and 15 percent sodium benzoate.

*Procedure*

CORE

A granulation is made of the active ingredients and the diluent using as a binder the zein dissolved in alcohol. The granulation is dried and screened. The magnesium stearate and the talc are mixed with the granulation and the final mixture is compressed into tablet cores.

Three coats of 4 pound cut pharmaceutical glaze are applied to the tablet cores, each coat is dusted with flour, and the tablets are allowed to dry overnight.

Then a wetting syrup (gelatin, sugar, and water) is applied and dusted with flour. This application is repeated four times. The tablets are dried overnight in trays at 45 degrees centigrade.

Next, three coats of a smoothing syrup (flour, sugar, and water) are applied. The tablets are dried overnight at room temperature.

The next day the tablets are sealed with one coat of 4 pound cut pharmaceutical glaze. This is followed by repeated applications of sugar syrup containing the colorant, until the tablet weight is 480 milligrams. After drying overnight in trays at room temperature, the tablets are polished with a solution of carnauba wax and white wax in chloroform.

The calcium pantothenate can be also included in the tablet coating instead of the core. dl-Panthenol, dl-calcium pantothenate-calcium chloride complex, and d-panthenol can be used in the place of calcium pantothenate in the tablet core or in the tablet coating.

The improved stool softener may also be supplied in hard 300 milligram gelatin capsules having the following composition:

| | Parts per capsule |
|---|---|
| Dioctyl sodium sulfosuccinate | 118 |
| Calcium pantothenate, USP | 50 |
| Calcium gluconate | 54 |
| Talc | 6 |
| Magnesium stearate | 2 |
| Starch | q.s. 300 |

The composition may also be made available in soft gelatin capsules by dispersing dioctyl sodium sulfosuccinate and calcium pantothenate in a vegetable oil or polyethylene glycol mixture, and filling this dispersion into soft gelatin capsules according to standard procedures. A dry blend of the composition cited for the hard gelatin capsule may also be filled into soft gelatin capsules using available techniques. Other obvious variations will suggest themselves to one skilled in the art.

All the clinical data accumulated to date provide unequivocal evidence that the efficacy of the dioctyl sodium sulfosuccinic salts for the non-laxative relief of chronic constipation is substantially enhanced by the addition of calcium pantothenate or one of its equivalent forms. Shown below are typical results of a double-blind clinical comparison of dioctyl sodium sulfosuccinate alone (DOS) and dioctyl sodium sulfosuccinate with calcium pantothenate (DOS+CP).

*Results of Trials in 42 Cases*

| | Number of Trials | Satisfactory | Unsatisfactory |
|---|---|---|---|
| DOS | 25 | 8 (32 percent) | 17 |
| DOS+CP | 40 | 25 (63 percent) | 15 |

Crossover trials have been carried out in 18 cases. The comparative efficacy of the two drugs, tried in the same patients, is shown in the following tabulation:

*Results of Crossover Trials in 18 Cases*

| | Number of Trials | Satisfactory | Unsatisfactory |
|---|---|---|---|
| DOS | 18 | 7 (39 percent) | 11 |
| DOS+CP | 18 | 13 (72 percent) | 5 |

In the above trials, the anticonstipant compositions containing 100 milligrams of dioctyl sodium sulfosuccinate, or 100 milligrams of dioctyl sodium sulfosuccinate plus 50 milligrams of calcium pantotenate, were administered twice a day for a period ranging from 7 to 21 days. With the latter, a therapeutic response occurred, usually after one day but sometimes only after two or three days had elapsed.

The usual dosage unit of the compositions of this invention contain 100 milligrams of dioctyl sodium sulfosuccinate and 50 milligrams of calcium pantothenate. They are normally administered by mouth once or twice daily.

Various modifications, obvious to those skilled in the art, may be made in the present invention without departing from the spirit or scope thereof. The subject matter which the applicant regards as his invention is particularly pointed out and claimed as follows.

I claim:

1. Anticonstipative compositions containing 50 to 250 milligrams of dioctyl sodium sulfosuccinate and 12.5 to 250 milligrams of calcium pantothenate.

2. Anticonstipative compositions containing 100 to 200 milligrams of dioctyl sodium sulfosuccinate and 50 to 100 milligrams of calcium pantothenate.

3. Anticonstipative compositions containing 118 milligrams of dioctyl sodium sulfosuccinate and 50 milligrams of calcium pantothenate.

4. The method of treating chronic constipation which comprises the oral administration of dosage units of dioctyl sodium sulfosuccinate and calcium pantothenate.

5. The method of treating chronic constipation which comprises the daily oral administration of compositions containing 100 to 200 milligrams of dioctyl sodium sulfosuccinate and 50 to 100 milligrams of calcium pantothenate.

6. The method of treating chronic constipation which comprises the daily oral administration of compositions containing 118 milligrams of dioctyl sodium sulfosuccinate and 50 milligrams of calcium pantothenate.

7. The improvement in the method of treating chronic constipation which comprises administering one-quarter to one part by weight of calcium pantothenate per part of dioctyl sodium sulfosuccinate in conjunction with an anticonstipative composition containing the said dioctyl sodium sulfosuccinate.

References Cited in the file of this patent

UNITED STATES PATENTS 2,885,322    Klotz _____ May 5, 1959

OTHER REFERENCES

Felten: Current List of Medical Literature, vol. 25, No. 1, January 1954, p. 180 (item 11929).

Portella: Excerpta Medica, Internal Medicine, Section VI, vol. 13, part 1, 1959, p. 78 (item 334).